United States Patent [19]
Garcia

[11] Patent Number: 4,641,016
[45] Date of Patent: Feb. 3, 1987

[54] DEVICE FOR FORMING TUNNELS IN COMPOSITE WALL PANELS

[76] Inventor: Michel Garcia, 2 place de l'Hôtel de Ville, Miramont De Guyenne, France

[21] Appl. No.: 675,643

[22] Filed: Nov. 28, 1984

[30] Foreign Application Priority Data

Nov. 30, 1983 [FR] France ............... 83 19262

[51] Int. Cl.⁴ .................. B23B 49/00; H05B 3/44
[52] U.S. Cl. .................. 219/523; 408/76; 219/201
[58] Field of Search ............... 219/205, 213, 523, 200, 219/201, 229; 83/170, 171, 15, 16; 408/76, 72 R, 127

[56] References Cited

U.S. PATENT DOCUMENTS

| | | | |
|---|---|---|---|
| 957,897 | 5/1910 | Neubert | 408/76 |
| 1,408,802 | 3/1922 | Crocker | 408/72 |
| 2,305,895 | 12/1942 | Pearson | 408/127 |
| 2,507,750 | 5/1950 | Barlow | 219/523 |
| 2,515,724 | 7/1950 | McCroskey | 254/134.3 R |
| 2,516,950 | 8/1950 | Bragg | 219/523 |
| 2,567,994 | 9/1951 | Downs | 408/72 |
| 2,611,434 | 9/1952 | Mugler | 83/171 |
| 2,711,199 | 6/1955 | Salsberg | 408/127 |
| 2,727,128 | 12/1955 | Jaye | 83/170 |
| 2,747,384 | 5/1956 | Beam | 408/127 |
| 2,764,192 | 9/1956 | Poss | 408/127 |
| 2,958,349 | 11/1960 | McNutt | 408/127 |
| 3,016,073 | 1/1962 | Broussard | 408/127 |
| 3,075,573 | 1/1963 | Piazze | 83/171 |
| 3,148,268 | 9/1964 | Heinbuch | 219/205 |
| 3,157,553 | 11/1964 | Spallina | 83/171 |
| 3,162,066 | 12/1964 | Morey | 408/76 |
| 3,365,987 | 1/1968 | Heller | 408/72 |
| 3,396,616 | 8/1968 | Wright | 219/229 |
| 3,555,950 | 1/1971 | Gijsbers | 83/171 |
| 3,697,188 | 10/1972 | Pope | 408/72 |
| 4,136,579 | 1/1979 | Robinson | 408/72 R |
| 4,359,627 | 11/1982 | Talicichi | 219/523 |
| 4,378,488 | 3/1983 | Jager | 219/523 |

FOREIGN PATENT DOCUMENTS

| | | |
|---|---|---|
| 0041604 | 4/1981 | European Pat. Off. . |
| 575357 | 4/1933 | Fed. Rep. of Germany . |
| 516557 | 10/1929 | Fed. Rep. of Germany . |
| 2538588 | 8/1975 | Fed. Rep. of Germany . |
| 2285972 | 4/1976 | France ............... 408/76 |

Primary Examiner—E. A. Goldberg
Assistant Examiner—Teresa J. Walberg
Attorney, Agent, or Firm—Robert J. Koch

[57] ABSTRACT

A device for boring tunnels to accommodate electrical cables or conduits in the thickness of an insulative material of a composite wall panel exhibiting a layer of this material covered on one or both sides with a rigid facing sheet made up of a mobile system and a positioning and guiding device for the mobile system. The mobile system incorporates a boring member mounted at the end of a flexible member, and the positioning and guiding device incorporates a removable support featuring means for attaching it to the or one facing sheet, in line with an opening formed in the latter, and a bent guide conduit adapted to be inserted into this opening. This conduit enables the boring and flexible members to penetrate into the insulative material parallel to the facing sheet, in the required direction and to the required distance.

9 Claims, 10 Drawing Figures

DEVICE FOR FORMING TUNNELS IN COMPOSITE WALL PANELS

BACKGROUND OF THE INVENTION

1. Field of the Invention

The present invention concerns a device for boring tunnels in composite wall panels consisting of a layer of an insulative material such as polystyrene or cellular cardboard, for example, covered on one or both sides with a rigid facing sheet. More specifically, it concerns a device for forming such tunnels for the passage of electrical cables or conduits in situ, that is to say when the wall panel (whether used as a lining panel or as a partition wall) has been installed.

2. Description of the Prior Art

This type of wall panel is manufactured and assembled in a factory and installed on site.

When spaces must be formed in the thickness of the polystyrene, for example, to provide for the passage of electrical cables or conduits, the polystyrene slab is then cut out which seriously degrades it, the major disadvantage being the creation of thermal bridges between the wall and the rigid facing sheet in line with the electrical cables or conduits.

The objective of the invention is specifically to alleviate such disadvantages by proposing a device for forming passages for electrical cables or conduits in the mass of the polystyrene or other insulative material after installation of the wall panel.

SUMMARY OF THE INVENTION

The invention consists in a device for boring tunnels in the thickness of an insulative material constituting a composite wall panel consisting of a layer of said material covered on one or both sides with a rigid facing sheet, said device comprising a mobile system incorporating a boring member mounted at the end of a flexible member and a positioning and guiding device for said mobile system incorporating a removable support featuring means for attaching it to the or one facing sheet in line with an opening formed therein and a bent guide conduit adapted to be inserted into said opening so as to permit said boring and flexible members to penetrate into said insulative material parallel to said facing sheet, in the required direction and to the required distance.

In one application of the invention to boring tunnels in an insulative material consisting of polystyrene or a similar material, the boring member consists of an electrically heated bit of appropriate shape.

With a device of this kind, by pushing on the flexible member the heated bit is advanced into the polystyrene mass which vaporizes by sublimation in contact with the bit so that as the latter advances it bores a tunnel the wall of which hardens and serves as a guide as the bit is further advanced.

There is formed in this way a perfectly straight tunnel in the required direction determined by the initial positioning of the bent guide and to the required distance since all that is necessary is to push in the flexible member to the required length.

In another application of the invention to boring tunnels in an insulative material consisting of cellular cardboard, the boring member consists of a pointed rigid head fixed to the end of a strip constituting the flexible member. In this variation the device is fitted and used exactly as in the case with poystyrene, except for the fact that the insulative material is neither converted nor eliminated but bored through so as to permit the passage of cables and conduits of various kinds.

Other objects and advantages of the invention will appear from the following description of examples of the invention, when considered in connection with the accompanying drawings, and the novel features will be particularly pointed out in the appended claims.

DESCRIPTION OF THE PREFERRED EMBODIMENTS

Figure 1:
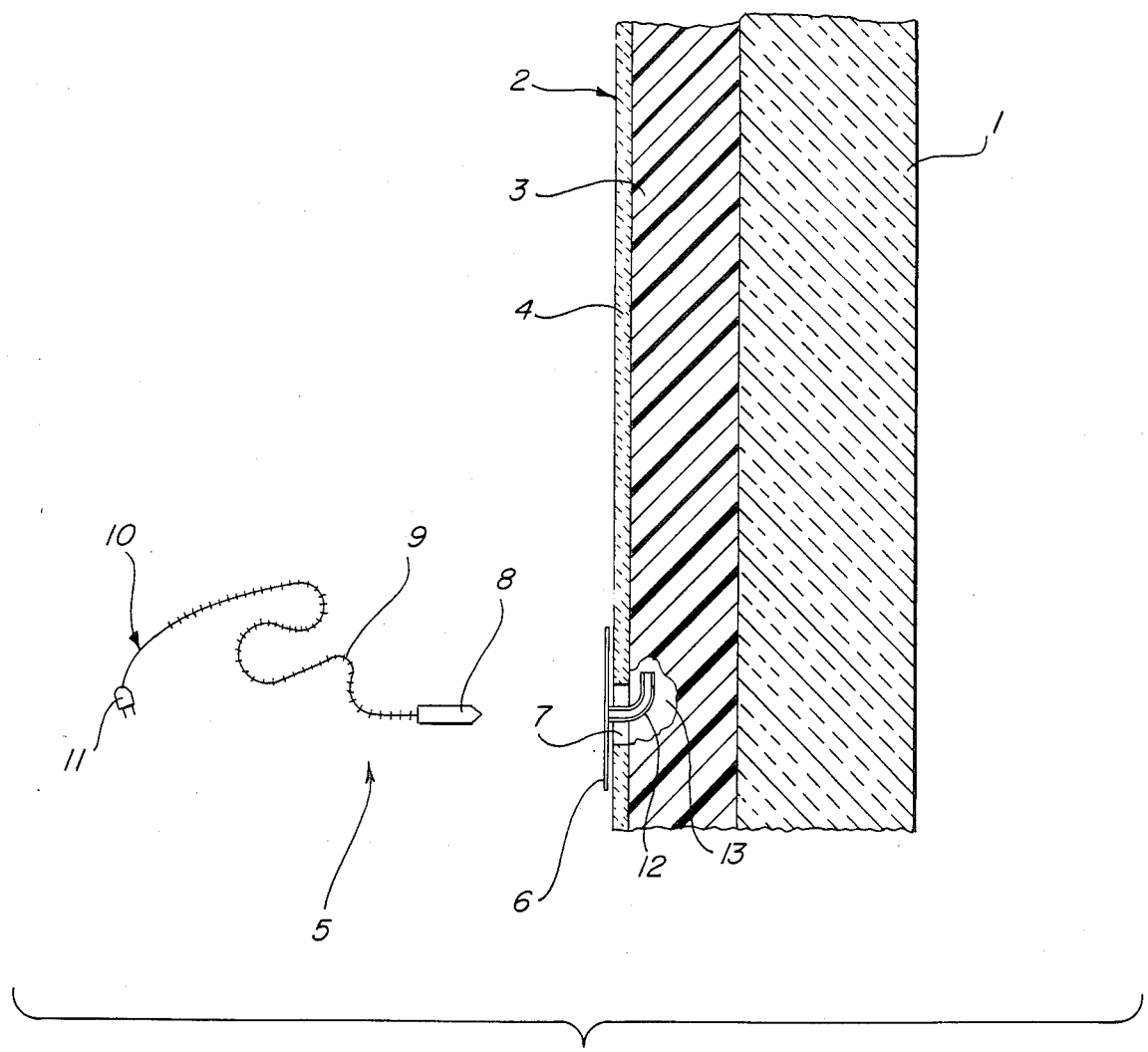
FIG. 1 is a schematic representation of the device in accordance with the invention ready for boring a tunnel into a polystyrene lining wall panel installed against a wall.

FIG. 1 shows in transverse cross-section a wall 1 lined on one side with a wall panel 2 consisting, in the known manner, of a slab 3 of polystyrene fastened to a rigid facing plate 4 which may be, for example, of the plasterboard type material known in France under the trade name "placoplâtre".

The combination 3–4 is manufactured in a factory and delivered ready for installation.

Using the current installation technique, an electrician charged with installing electrical cables and conduits between the wall panel 2 and the wall 1 must fix the cables and conduits to the wall 1 before the wall panel 2 is fitted and cut out the polystyrene layer 3 to its full thickness in line with the routes of the cables and conduits. It is not until the wall panel 2 has been fitted against the wall that he can resume the work of making electrical connections to the ends of the cables and conduits for installing socket outlets, switches, etc.

This procedure obliges the electrician to carry out his work in two stages, that is to say in two visits, which takes time and increases the installation cost. Futhermore, fitting the wall panel raises problems of installation because of the cut-outs and spaces to be formed in the polystyrene layer at the appropriate positions. Finally, for ease and speed of execution these cut-outs are generally made through the full thickness of the polystyrene, constituting thermal bridges between the wall 1 and the facing sheet 4 prejudicial to the thermal insulation properties of the wall panel 2.

The device in accordance with the invention schematically represented in FIG. 1 overcomes these disadvantages by enabling the electrician to wait until the wall panel 2 has been laid against the wall 1 before starting work.

To this end there is provided in accordance with the invention, on the one hand, a device 5 adapted to bore a tunnel in the thickness of the polystyrene 3, that is to say between the facing sheet 4 and the wall 1, and, on the other hand, a device 6 for positioning and guiding the means 5 in line with an opening 7 formed in the sheet 4. This opening may be located, for example, at the position of a socket outlet to be installed and electrically connected to the distribution circuit through cables or ducts which have to be passed through the polystyrene slab 3.

The device 5 which constitutes the active system comprises an electrically heated bit 8 of circular cross-section fixed to the end of a flexible member 9, the electrical conductors 10 supplying current to the bit 8 being run inside the flexible member 9 and terminated with a plug 11.

The positioning-guiding device 6 in line with the opening 7 consists of a removable support provided with means for fastening it to the facing sheet 4 and a bent conduit 12 for guiding the bit 8 and the flexible member, the bent guide conduit being inserted through the opening 7 into a recess 13 formed in the polystyrene slab.

Figure 2:
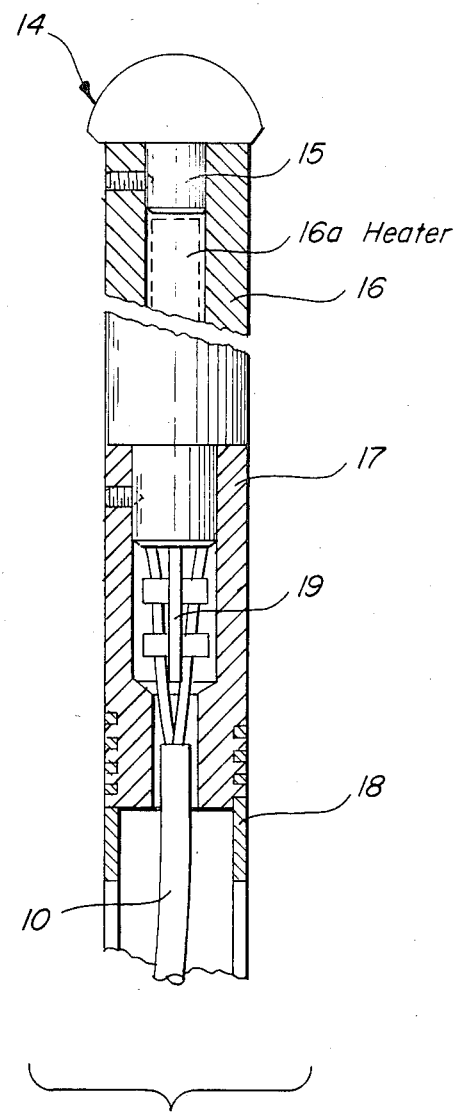
FIG. 2 is a view partly in axial cross-section of a bit with the flexible member to which it is attached and which propels it.
Figure 3:
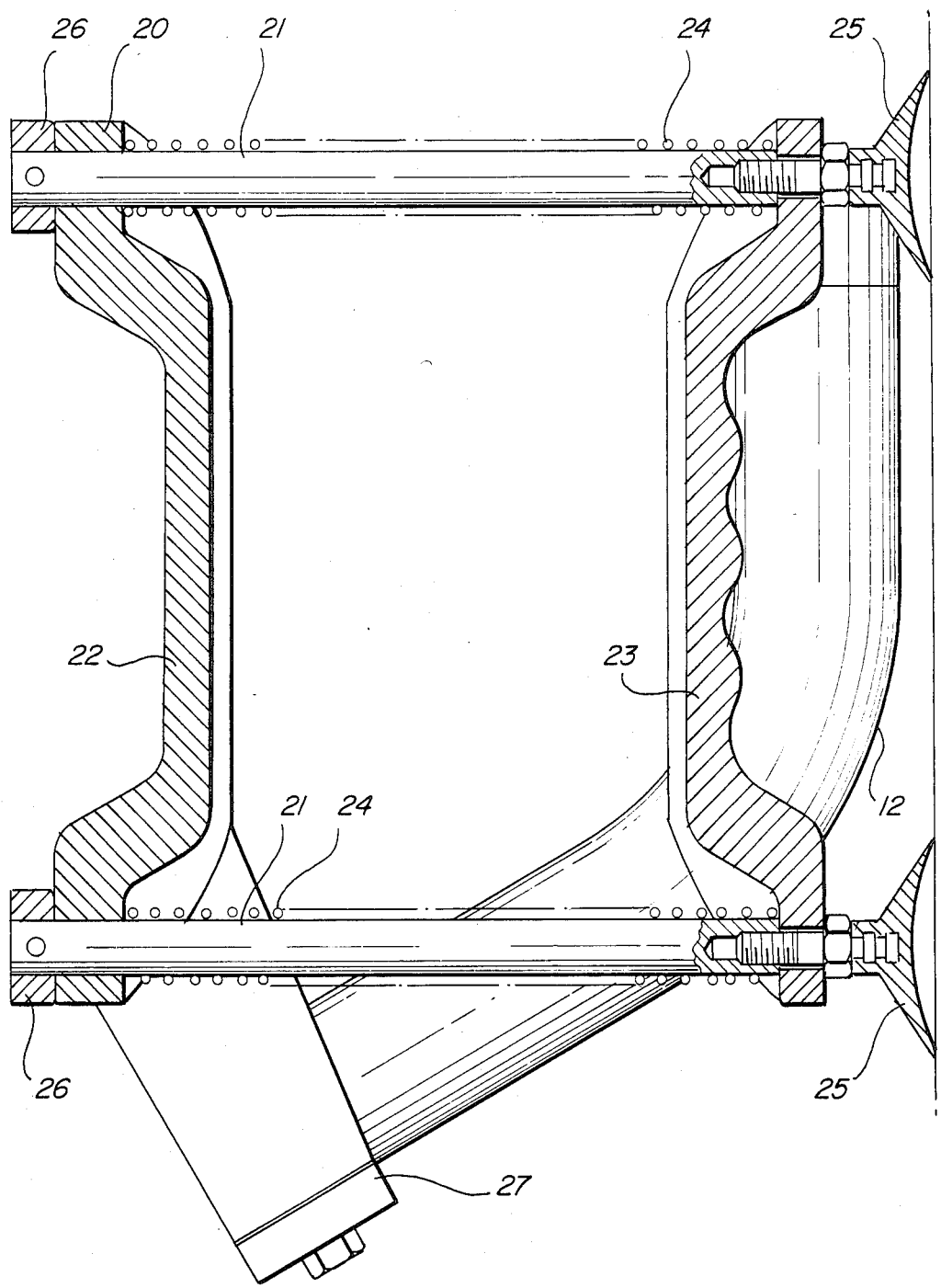
FIG. 3 is a view in side elevation and cross-section of the means for positioning the heated bit.

FIG. 2 shows one embodiment of the system 5.

The bit comprises a substantially hemispherical head 14 equipped with a peg 15 for centering and fixing the head to the end of a cylindrical steel sleeve 16. The head 14 is removably mounted on the sleeve 16. This is also removably mounted at the end of a cylindrical sheath 17 of a refractory and insulative plastics material, itself mounted axially on a metal flexible member 18.

The flexible member 18 is formed by a spring steel wire of square cross-section, for example, formed into a helical spring with contiguous turns of which the outside diameter is substantially equal to that of the sheath 17 of the sleeve 16.

The flexible member 18 may be attached to the sheath 17 by screwing the last few turns onto an appropriate thread formed on the sheath, for example.

The heating elements or heater 16A of the head 14 are housed in the sleeve 16 and connected via a terminal board 19 housed in the sheath 17 to the conductors 10 which run inside the flexible member 18 over its entire length.

FIGS. 3 through 6 show one embodiment of the device 6 for positioning and guiding the device of FIG. 2.

This device consists of a rectangular frame 20 slidedly mounted on four parallel guide tubes 21.

Two of the opposed sides of the frame form two half-handles 22 cooperating with two opposed half-handles 23 fastened to one end of the guide tubes 21.

Springs 24 are engaged over the guide tubes between the half-handles 22, 23.

Suckers 25 for fastening the device to the smooth outside surface of the sheet 4 are attached to the same ends of the guide tubes 21 as the fixed half-handles 23.

The half-handles 22 are retained on the guide tubes 21 by stops 26.

The frame 20 carries a system 27 for clamping the bent guide conduit 12 which has an inside diameter slightly larger than the outside diameter of the combination of the sleeve 16 and sheet 17.

Figure 6:
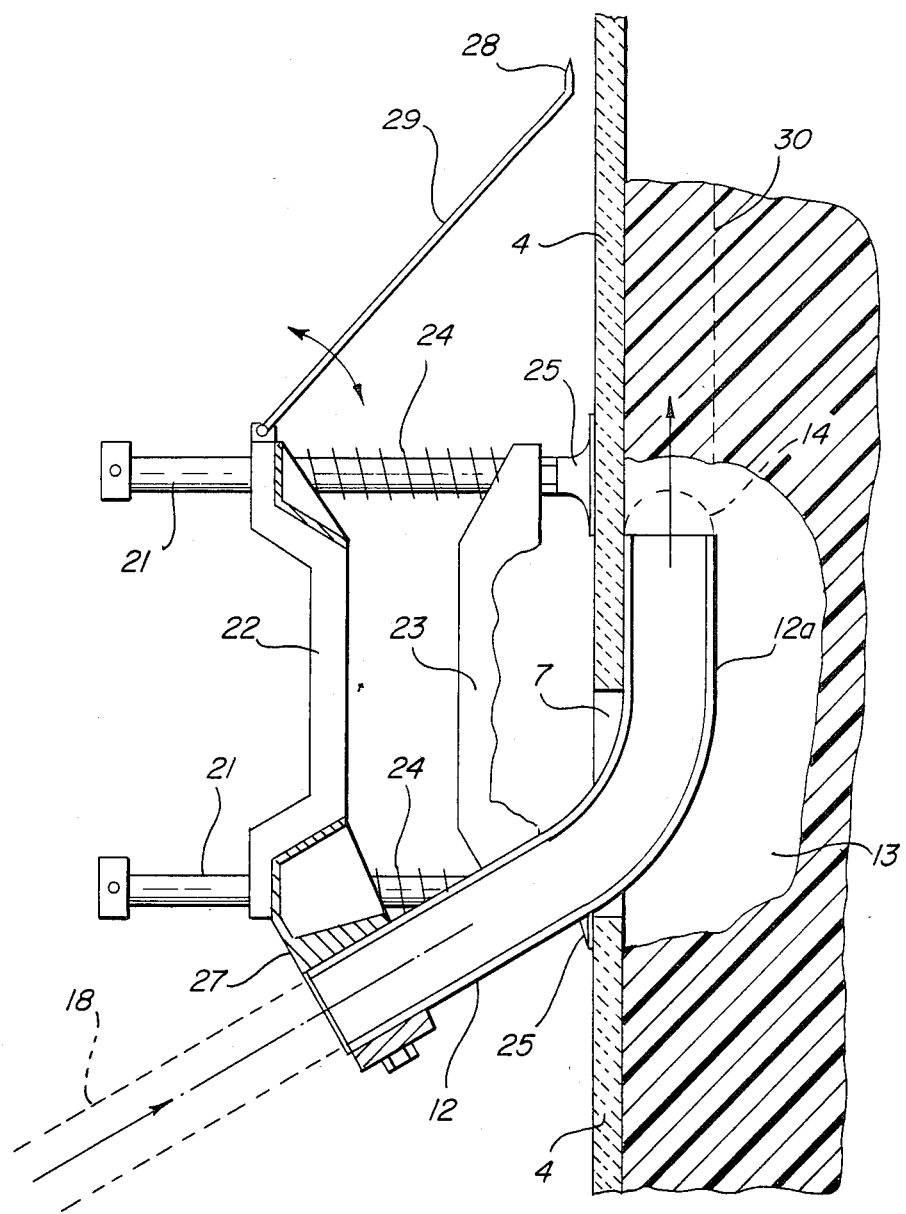
FIG. 6 shows the device of FIG. 3 fitted over an opening in a facing sheet of a lining wall panel.

In FIG. 6 the head 14 of the bit shown in FIG. 2 and the flexible member 18 are represented in dashed outline.

The bent guide 12 terminates in line with the fastening system 27.

OPERATION

The device shown and described hereinabove operates in the following manner.

With the bit 8 and the flexible member 18 being first inserted into the bent conduit 12 as shown in FIG. 6, the positioning device is grasped in both hands by the half-handles 22-23. These are pulled as close together as possible so as to move the end of the bent conduit 12 away from the plane delimited by the suckers 25 in order to permit insertion of the end of the bent conduit carrying the bit 8 through the opening 7 (FIG. 6) in the sheet 4 into the recess 13 previously formed in the polystyrene mass.

The half-handles 22-23 are then released so that the sheet 4 is sandwiched between the four suckers 25 disposed around the opening 7 and the part 12a of the bent conduit 12 parallel to the plane of the suckers, as shown in FIG. 6.

It will be understood that the part 12a is oriented in the direction in which the tunnel for cables or conduits to be passed through is to be formed in the polystyrene.

Figure 4:
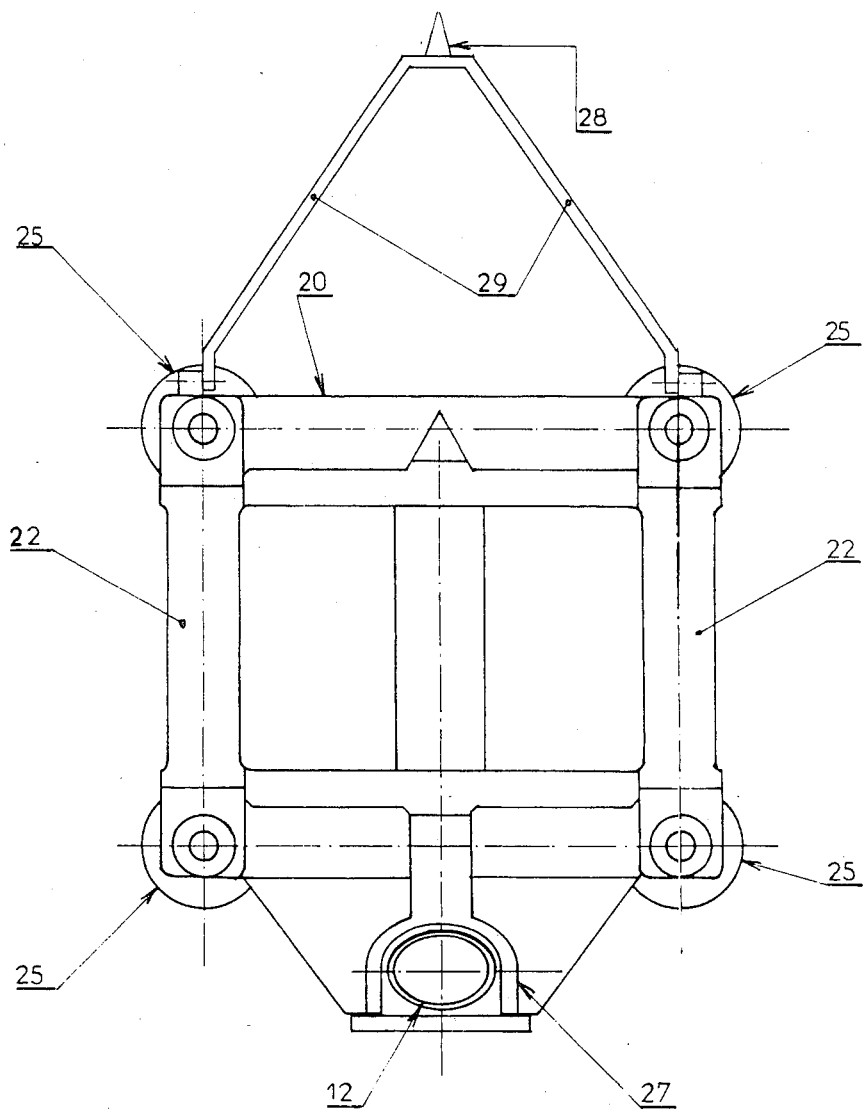
FIG. 4 is a view of the device of FIG. 3 as seen from the lefthand side.
Figure 5:
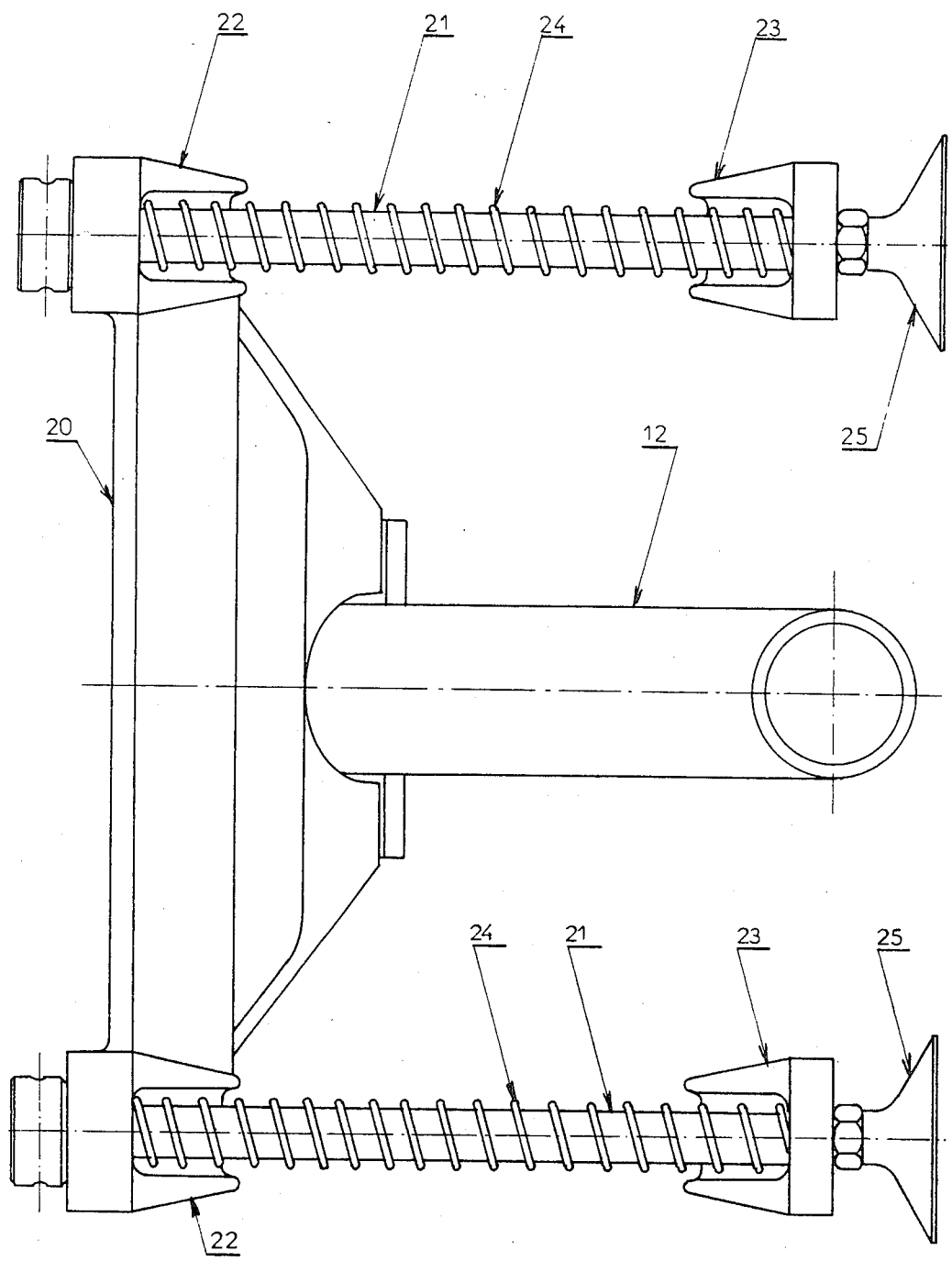
FIG. 5 is a view of the device of FIG. 3 as seen from above.

To facilitate this orientation, the device is advantageously provided with a direction indicator consisting, for example, as shown in FIGS. 4 and 6, of a guide indicator 28 fastened to the end of rods 29 pivoted to the half-handles 22 so that the indicator 28 may be moved towards and away from the sheet 4 at will. In this way the indicator may be positioned exactly in line with a line previously drawn on the sheet 4 and marking the axis of the tunnel to be formed.

It is then sufficient to push the semi-rigid flexible member 18 into the guide 12 so as to bring the bit 8, previously connected to a socket outlet, into contact with the polystyrene, which vaporizes through sublimation. Thus as the flexible member 18 is pushed in there is formed a tunnel 30 of circular cross-section, its diameter substantially corresponding to that of the head 14.

The walls of this tunnel 30 harden immediately after the heating head passes them and form a guide conduit precisely aligned with the part 12a in such a way that the tunnel is strictly rectilinear and remains in contact with the internal surface of the sheet 4.

The tunnel may be readily formed to whatever length is required, this corresponding to the length of the flexible member inserted into the bent guide 12.

To remove the device it is merely necessary to pull on the flexible member 18 until the shoulder of the head 14 butts up against the end of the bent conduit 12 and then to remove the frame 20 with the guide 12 and the combination 14–18 by carrying out the reverse operation to that already described.

Forming a tunnel 30 in this way is extremely fast and clean and does not result in any thermal bridging between the sheet 4 and the wall 1 since the tunnel is at all points at a significant distance from the wall 1.

Tunnels of different diameters may be formed by changing the head 14 and where necessary the bent conduit 12.

It is a very simple matter for the electrician to then pass cables or conduits into tunnels formed in this way between two specific points on the lining wall panel 2.

The flexible member 18 which provides the transverse flexibility and the longitudinal rigidity which are both necessary may be made in a number of separate sections which can be fitted together end-to-end for ease of manipulation, means obviously being provided in this case to make the necessary electrical connections to the heating bit.

MODIFICATIONS

Figure 7:
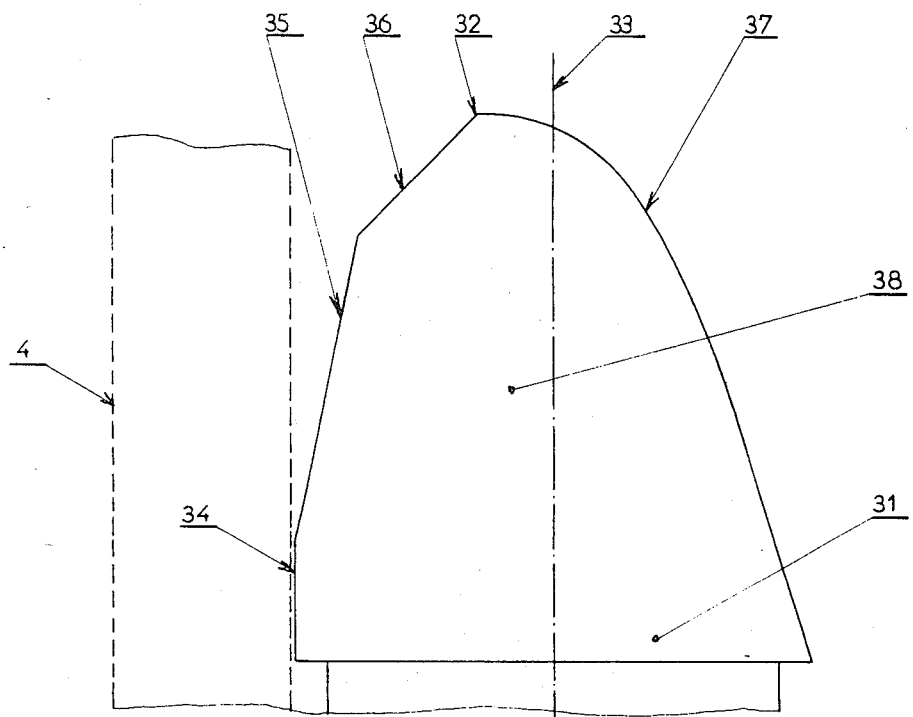
FIGS. 7 and 8 are respectively a lateral and a plan view of a modified form of heating bit.
Figure 8:
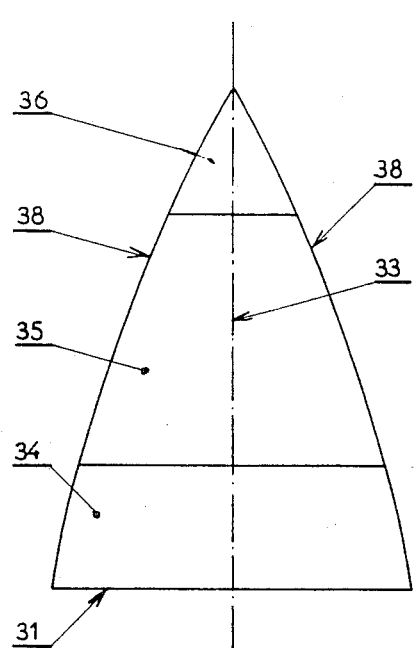

FIGS. 7 and 8 show a variation on the heating bit designed to ensure that the tunnels are bored in immediate contact with the inside surface of the facing sheet 4 under all circumstances.

To this end the bit 31 shown in FIG. 7 is asymmetric as seen from the side, in the sense that the tip 32 is substantially offset relative to the axis 33 of the head in the direction towards the sheet 4.

As seen from above (FIG. 8) the bit 31 has a relatively tapered ogival shape.

The side of the bit 31 directed towards the sheet 4 comprises a first plane face 34 parallel to the axis 33, in line with the widest section of the head, followed by a second plane face 35 inclined at between 15° and 20° relative to the sheet 4, followed by a third substantially triangular plane face 36 terminating at the tip 32 and inclined at approximately 45° relative to the sheet 4. The face 37 of the head 31 opposite the sheet 4 and the lateral flanks 38 are curved after the fashion of a ship's hull.

The specific shape of the head 31 constrains it to be forced against the sheet 4 at all times as it progresses through the polystyrene.

The invention naturally applies to partition wall panels comprising a sheet 4 on each side of the polystyrene, as well as to any wall panel utilizing an internal insulative material which is capable of sublimation other than polystyrene or an insulative material which can be bored in some other manner.

Figure 10:
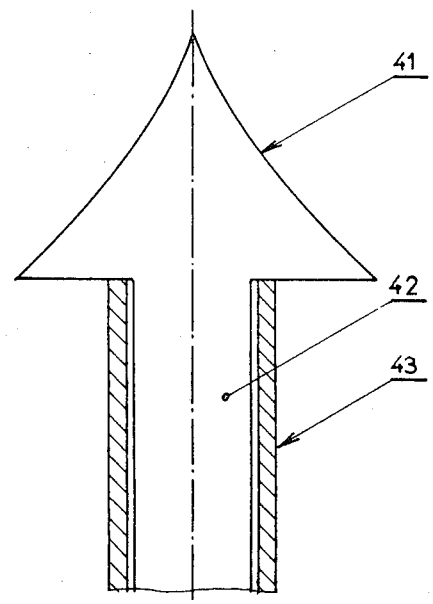
FIG. 10 is a view from above of the boring head of the device of FIG. 9 and of the end of the guide conduit for the strip to the end of which the head is attached.
Figure 9:
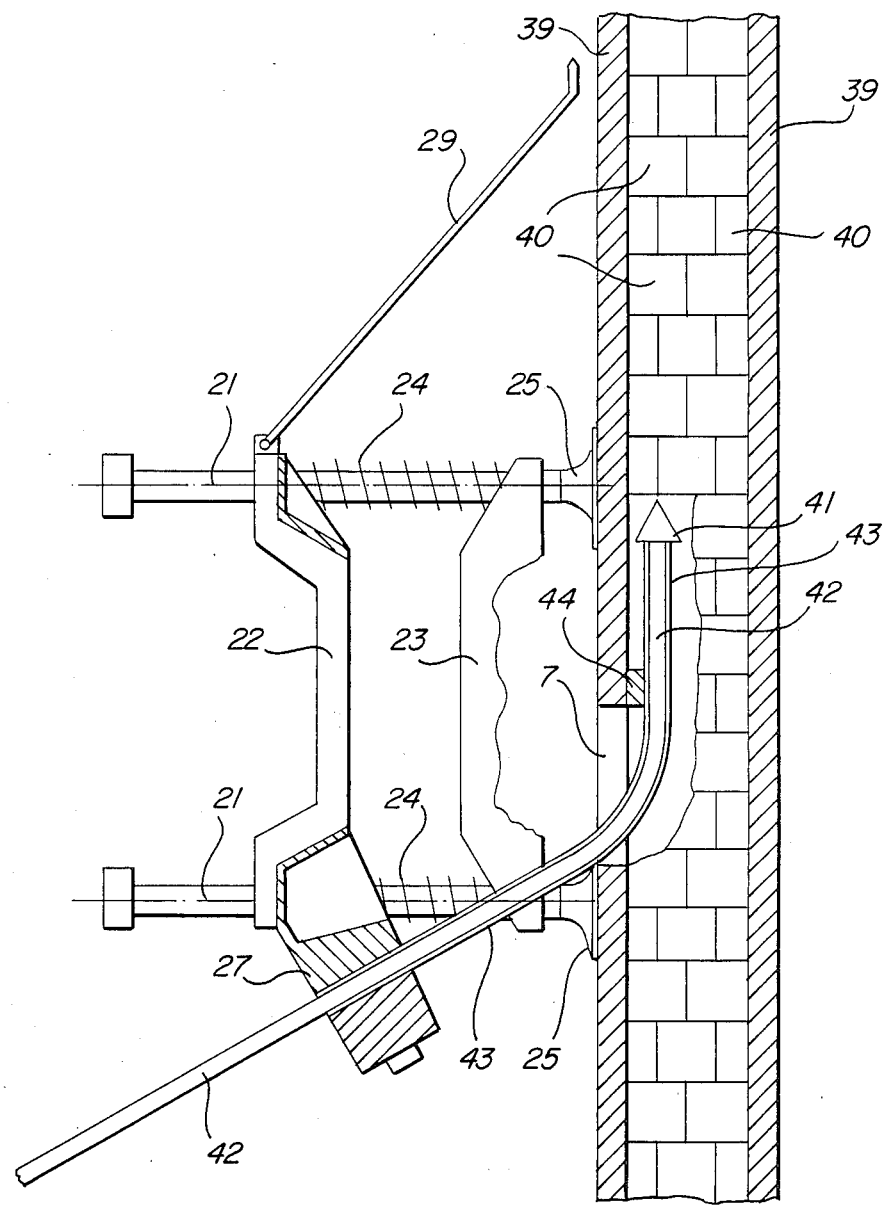
FIG. 9 shows in vertical axial cross-section one embodiment of the device for boring tunnels into a partition wall panel of which the insulative material is cellular cardboard.

FIGS. 9 and 10 show an application of the invention to a wall panel in which the internal insulative material is cellular cardboard. This type of wall panel as represented in FIG. 9 is well known and comprises two rigid facing sheets 39 between which extend sheets of cardboard symbolically represented at 40 and disposed perpendicularly to one another and separated so as to form cubical cells filled with air between the sheets 39.

This type of wall panel is manufactured by the French company PREGYPAN and marketed under the trade name PLACOPAN, for example.

For this particular application the device in accordance with the invention is identical to that described hereinabove except with regard to the boring member and the associated flexible propulsion member. In FIG. 9, components analogous to those of the device in FIG. 6 carry the same reference numerals.

The boring member consists of a pointed rigid head 41 pyramidal in the shape of a four-sided roof (FIGS. 9 and 10). The head 41 is attached to the end of a metal strip or analogous member 42 of rectangular cross-section constituting the aforementioned flexible propulsion member and guided by a tubular guide 43 of rectangular cross-section analogous to the guide conduit 12 of FIG. 6.

Because the head 41 projects outside the external contour the guide conduit 43, the latter is fitted on the side parallel to the handles 22, 23 and directed towards the adjacent sheet 39 (FIG. 9) with a flat chocking member 44 designed to maintain the axis of the guide conduit 43 at a sufficient distance away from the inside surface of the sheet 39.

It will be understood that various changes in the details, materials and arrangements of parts which have been herein described and illustrated in order to explain the nature of the invention may be made by those skilled in the art within the principle and scope of the invention as expressed in the appended claims.

This applies, for example, to the positioning means for the bent guide conduit 12 or 43, the structure of the flexible member 18 or 42 to which the boring member 14, 31 or 41 is attached and by which it is propelled, and to the shape, arrangement and nature of the boring member.

There is claimed:

1. Device for boring tunnels in the thickness of an insulative material constituting a composite wall panel comprising a layer of said material covered on at least one side with a rigid facing sheet, said device comprising:

a mobile system incorporating a boring member and a flexible member at an end of which said boring member is mounted;

and means for positioning and guiding said mobile system including a removable support exhibiting means for attaching said removable support to a rigid facing sheet in line with an opening formed therein, and bent conduit means for guiding said boring and flexible member to penetrate into said insulative material parallel to said facing sheet in a preset direction and to a desired distance connected to said removable support and adapted to extend beyond said means for attaching.

2. Device according to claim 1 for boring tunnels wherein said material is a plastics material capable of sublimation, and wherein said boring member is an electrically heated bit.

3. Device according to claim 1, wherein said flexible member comprises a helical spring with contiguous turns.

4. Device according to claim 3, wherein said boring member comprises a bit, heating elements for heating said bit, a sleeve surrounding said heating elements and to which said bit is removably attached, an electrical terminal board attached to said sleeve, a sheath accommodating said electrical terminal board and to which the end of said helical spring is attached, and electrical conductors for conveying current to said heating elements, accommodated inside said helical spring.

5. Device according to claim 4, wherein said bit exhibits inclined plane facets directed towards an inside surface of the sheet and an ogival portion directed away from said sheet.

6. Device according to claim 1 for boring tunnels in cellular cardboard wherein said boring member is a tapered head and said flexible member is a longitudinally rigid but transversely flexible rod to the end of which said head is attached.

7. Device according to claim 6, wherein said tapered head is pyramidal in shape and said rod is a metal strip, and further comprising a conduit of appropriate rectangular cross-section adapted to guide said strip.

8. Device according to claim 1, wherein said means for positioning and guiding comprise a rectangular frame carrying said bent conduit means, four guide tubes on which said frame is slidably mounted, suckers at the ends of said guide tubes for attaching them to an outside surface of said facing sheet, an arrangement of handles mounted on said guide tubes, return springs adapted to implement relative movement towards and away from one another of the end of said guide conduit and said suckers so as to position the guide conduit by sandwiching the facing sheet between said suckers and said end of the guide conduit.

9. Device according to claim 8, wherein said positioning and guiding means comprise a direction indicator and a support pivoted to said frame and to which said indicator is fixed.

* * * * *